(12) United States Patent
Vierle et al.

(10) Patent No.: US 9,162,926 B2
(45) Date of Patent: Oct. 20, 2015

(54) PROCESS FOR MANUFACTURING A HYDRAULIC BONDING AGENT, CORRESPONDING ADDITIVE AND ITS USE

(71) Applicant: Construction Research & Technology GmbH, Trostberg (DE)

(72) Inventors: Mario Vierle, Wasserburg (DE); Martin Ernst, Heidelberg (DE); Madalina Andreea Stefan, Trostberg (DE)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 14/396,787

(22) PCT Filed: Apr. 22, 2013

(86) PCT No.: PCT/EP2013/058241
§ 371 (c)(1),
(2) Date: Oct. 24, 2014

(87) PCT Pub. No.: WO2013/164213
PCT Pub. Date: Nov. 7, 2013

(65) Prior Publication Data
US 2015/0114266 A1 Apr. 30, 2015

(30) Foreign Application Priority Data
May 4, 2012 (EP) .................................... 12166743

(51) Int. Cl.
*C04B 28/04* (2006.01)
*C04B 24/02* (2006.01)
*C04B 24/12* (2006.01)
*C04B 24/18* (2006.01)
*C04B 24/38* (2006.01)
*C04B 28/02* (2006.01)
*B01D 19/04* (2006.01)

(52) U.S. Cl.
CPC .......... *C04B 24/023* (2013.01); *B01D 19/0404* (2013.01); *C04B 24/121* (2013.01); *C04B 24/123* (2013.01); *C04B 24/18* (2013.01); *C04B 24/38* (2013.01); *C04B 28/02* (2013.01); *C04B 28/04* (2013.01)

(58) Field of Classification Search
CPC ... C04B 24/023; C04B 28/04; B01D 19/0404
See application file for complete search history.

(56) References Cited

U.S. PATENT DOCUMENTS

| | | |
|---|---|---|
| 4,948,429 A | 8/1990 | Arfaei |
| 4,990,190 A | 2/1991 | Myers et al. |
| 5,017,234 A | 5/1991 | Gartner et al. |
| 5,084,103 A | 1/1992 | Myers et al. |
| 5,661,206 A | 8/1997 | Tanaka et al. |
| 6,139,623 A | 10/2000 | Darwin et al. |
| 6,352,952 B1 | 3/2002 | Jardine et al. |
| 6,358,310 B1 | 3/2002 | Berke et al. |
| 6,670,415 B2 | 12/2003 | Jardine et al. |
| 6,858,661 B2 | 2/2005 | Zhang et al. |
| 2002/0111399 A1 | 8/2002 | Bury et al. |
| 2003/0187101 A1 | 10/2003 | Shendy et al. |
| 2007/0266905 A1 | 11/2007 | Amey et al. |
| 2011/0290158 A1 | 12/2011 | Kuo |
| 2011/0306704 A1 | 12/2011 | Cheung et al. |
| 2012/0137932 A1 | 6/2012 | Cheung |
| 2012/0291676 A1 | 11/2012 | Kuo |

FOREIGN PATENT DOCUMENTS

| | | |
|---|---|---|
| FR | 2 706 447 A1 | 12/1994 |
| WO | WO 01/42161 A2 | 6/2001 |
| WO | WO 2010/085425 A1 | 7/2010 |
| WO | WO 2011/022217 A1 | 2/2011 |
| WO | WO 2011/149714 A1 | 12/2011 |

OTHER PUBLICATIONS

PCT/EP2013/058241—International Search Report, May 27, 2013.
PCT/EP2013/058241—International Written Opinion, May 27, 2013.
PCT/EP2013/058241—International Preliminary Report on Patentability, Nov. 4, 2014.

*Primary Examiner* — Paul Marcantoni
(74) *Attorney, Agent, or Firm* — Curatolo Sidoti Co., LPA; Joseph G. Curatolo; Salvatore A. Sidoti

(57) ABSTRACT

The invention relates to a method for producing a hydraulic binder, comprising contacting a composition comprising cement clinker, before, during or after the grinding procedure, with (a) a defoaming agent and (b) 0.0005% to 2% by weight, based on the total composition, of at least one air-introducing compound, the defoaming agent (a) comprising 0.0001% to 0.5% by weight, based on the total composition, of at least one defoaming agent of the formula $R^{10}$—$(C_mH_{2m}$—$O$—$)_x$—$(C_dH_{2d}$—$O$—$)_c$—H and the ratio of (a) to (b) being between 1:1 to 1:200.

16 Claims, No Drawings

PROCESS FOR MANUFACTURING A HYDRAULIC BONDING AGENT, CORRESPONDING ADDITIVE AND ITS USE

CROSS REFERENCE TO RELATED APPLICATIONS

This application is a national stage application of International Application No. PCT/EP2013/058241, filed 22 Apr. 2013, which claims priority from European Patent Application No. 12166743.0, filed 4 May 2012, from which applications priority is claimed, and which are incorporated herein by reference.

The invention relates to cement additives and especially to a method for producing a hydraulic binder, where a composition comprising cement clinker is contacted—before, during or after the grinding procedure—with a specific defoaming agent and with at least one air-introducing compound. Further disclosed are a corresponding additive and also the use thereof for improving the compressive strength of cured building material products produced therewith.

Substances are considered hydraulic when they harden both in air and under water and are water-resistant. Hydraulic binders are, more particularly, cement and pozzolans, such as fly ash, blast furnace slag and trass, for instance.

The greatest economic importance among the hydraulic binders is possessed by cement. Made up with water, cement produces cement slurry, which solidifies by hydration and hardens, and which even after hardening remains solid and three-dimensionally stable under water. Cement consists substantially of Portland cement clinker and may further comprise, for example, slag sand, pozzolan, fly ash, limestone, fillers and cement admixtures. Viewed statistically, the cement constituents must be homogeneous in terms of their composition, and this can be achieved in particular by appropriate grinding and homogenizing techniques.

A key step in cement production is therefore the grinding of the cement clinker. Given that cement clinkers are very hard, their comminution consumes a great amount of energy. For the properties of the cement it is important that it is a fine powder. The fineness of the cement is therefore an important quality feature. In order to facilitate the comminution into powder form, assistants referred to as grinding assistants are used. In this way, the grinding times and energy costs are greatly reduced. A particular function of grinding assistants is also that of allowing a greater fineness of grind of the grindstock in the grinding of cement clinker or limestone, for example.

Grinding assistants act by enveloping the particles—which have a tendency towards agglomeration—with thin layers, more particularly monomolecular layers, and thus lead to neutralization of the surface charges. Viewed physically, the grinding assistants rapidly provide charge carriers which are available for satisfying the charges which come about on the fracture surfaces during fracture of the clinker particles, and so reduce the tendency towards agglomeration. In addition, grinding assistants are absorbed on the fracture surfaces of the grains prior to separation, and prevent them from reuniting on exposure to temperature and pressure.

The activity of known grinding assistants is very varied. The amount in which grinding assistants are added, based on the grindstock, is typically between 0.05% and 0.2% by weight. The known grinding assistants include, for example, glycols, more particularly mono-, di-, tri- and polyglycols, polyalcohols such as glycerol, for instance, alkanolamines, more particularly triethanolamine and triisopropanolamine, organic acids, more particularly acetic acid or salts thereof, amino acids, molasses, and also organic and inorganic salts, based more particularly on acetate, formate, gluconate, chloride, fluoride, nitrate and sulphate.

In spite of numerous developments in grinding technology, the major part of the cement is still ground in tubular ball mills, where the effect of grinding assistants is accorded particular significance. Generally speaking, the raw cement material is dry-ground. In the course of the dry preparation procedure, the raw material components are fed to a mill in a particular mixing ratio, by way of metering devices, and are finely ground to a raw-ground state. During the grinding procedure, the grindstock undergoes heating, and the temperature of the grindstock taken from the grinding assembly may amount to 80 to 120° C.

In practice, a suitable grinding assistant is selected by aiming to optimise the following parameters in particular: preventing caking in the grinding assembly, obtaining the maximum fineness of grind or maximum specific surface area of the grindstock, improving the fluidity of the grindstock, homogenizing the grindstock, disrupting agglomerates of the grindstock, and reducing the costs of grinding assistants. In the final grinding of hydraulic binders, in particular, grinding assistants, as well as their action during the grinding procedure, may also have a positive effect on subsequent curing and on the mechanical properties of the cement, and this is a particular advantage.

Grinding assistants may therefore also be added in order to modify the physical properties of the finished cement. U.S. Pat. Nos. 4,990,190, 5,017,234 and 5,084,103 describe how certain higher trihydroxyalkylamines, such as triisopropanolamine and N,N-bis(2-hydroxyethyl)-2-hydroxypropylamine, improve the late strength, after 28 days after the production of the wet cement mixture, of Portland cement. The strength-enhancing higher trihydroxyalkylamine derivatives described in these patents are said to be particularly useful in mixed cements.

WO 2010/085425 discloses the use of polycarboxylate ethers as grinding assistants, which have a "backbone" based on carbon and polyether side chains. These compounds are stable with respect to the conditions prevailing during the grinding of hydraulic binders, such as high temperatures and shearing forces, and lead to better processing properties on the part of the composition produced.

It is also known, however, that numerous grinding assistants, such as triisopropanolamine and polycarboxylate ethers, for instance, have a tendency to increase the amount of air introduced into the cement while the latter is being made up. The production of concrete and mortar necessitates the mixing of hydraulic cement, sand, fillers and optionally further additives with water, to give a largely homogeneous mixture. As a consequence of the mixing of the components, air is enclosed within this system, being present generally in the form of finely divided bubbles. A low level of air introduction is tolerable and even has advantageous effects on freeze-thaw stability, provided that the amount of air and the size of the air bubbles remain within certain limits. In general, however, the introduction of air into these compositions is disadvantageous, since it significantly reduces the compressive strength of the cured products produced from them. As a rule of thumb, the assumption is that each volume percentage point of air bubbles introduced reduces the compressive strength by approximately 5%.

A series of additives is already in use in the cement industry for reducing the amount of air in cured hydraulic cement. These additives, referred to generally as defoamers, have a low HLB (hydrophilic-lipophilic balance), such as tri-n-butyl phosphate and n-octanol, for instance. However, the properties of these compounds are not satisfactory in every respect. To start with, these defoaming agents are difficult to incorporate into the dry cement, since in view of the small quantity employed, they cannot be homogeneously distributed. Furthermore, these defoaming agents are not miscible with the additives that are commonly employed, and therefore also cannot be used as a mixture with the conventional additives that are without exception water-miscible. The addition of such a defoamer to other additives in solution in water results after an extremely short time in separation of the defoamer, which therefore cannot be usefully supplied to the composition which is to be treated.

Defoamers are generally very effective and need therefore be used in very small amounts and must be distributed homogeneously in the compositions comprising a hydraulic binder. In terms of their metering and their distribution in the composition to be treated, the presently known defoamers are difficult to control. This results in unwanted effects, with both the amount of air introduced, owing to underdosing or overdosing, and the distribution of the introduced air bubbles frequently representing a problem as a result of inhomogeneous distribution of the defoamer.

WO 2011/022217 addresses mixtures of cement additives which introduce air into the cementitious system, and also defoamers based on ethoxylated, propoxylated fatty alcohols and also alkylphenols. An advantage of these defoamers is that they are stable with respect to the conditions which prevail during the grinding of hydraulic binders, such as high temperatures and shearing forces. Furthermore, however, these defoaming agents have the disadvantage that their defoaming activity is low and that in some cases the compounds described in fact lead to an increased introduction of air.

It was an object of the present invention, therefore, to provide improved defoaming agents in conjunction with air-introducing additives for compositions comprising hydraulic binders. As well as very good properties as grinding assistants, these mixtures ought, when made up with water, to result in minimal air introduction into the compositions comprising a hydraulic binder, with improved processing properties being obtained at the same time.

This object has been achieved by means of a method for producing a hydraulic binder, comprising contacting a composition comprising cement clinker, before, during or after the grinding procedure, with
(a) a defoaming agent and
(b) 0.0005% to 2% by weight, based on the total composition, of at least one air-introducing compound,
where the defoaming agent (a) comprises
0.0001% to 0.5% by weight, based on the total composition, of at least one defoaming agent of the formula $$R^{10}-(C_mH_{2m}-O-)_x-(C_dH_{2d}-O-)_c-H \qquad (I)$$

where
$R^{10}$ is a branched or unbranched $C_4$ to $C_{20}$ alkyl radical,
m for each ($C_mH_{2m}$—O—) unit independently of one another is identical or different and is 2 or 3,
d for each ($C_dH_{2d}$—O—) unit independently of one another is identical or different and is an integer between 4 and 20,
x is an integer between 2 and 20 and
c is an integer between 1 and 5,
and the ratio of (a) to (b) is between 1:1 to 1:200.

Surprisingly it has been found that the additive of the invention is very effective not only in relation to grinding. The stated object has been achieved in full, with the water make-up operation being accompanied only by a low level of introduction of air into the composition obtained in accordance with the invention. Furthermore, the product treated with the additive of the invention, after being made up with water, exhibits not only a very good early strength after one day but also an outstanding compressive strength after 28 days.

In one preferred defoaming agent of the formula (I) according to the invention, the radicals stand for the following definitions:
$R^{10}$ is a branched or unbranched $C_4$ to $C_{16}$ alkyl radical,
d for each ($C_dH_{2d}$—O—) unit independently of one another is identical or different and is an integer between 4 and 14,
x is an integer between 4 and 14 and
c is an integer between 1 and 4.

With particular preference, $R^{10}$ is a branched or unbranched $C_7$ to $C_{15}$ alkyl radical, m is 2, x is an integer between 7 and 11, d for each ($C_dH_{2d}$—O—) unit independently of one another is identical or different and is an integer between 4 and 14, and c is an integer between 1 and 3.

In this patent application the expression "an integer between" is understood to mean that also the numbers mentioned after the expression are embraced.

In one particularly preferred embodiment, $R^{10}$ is $C_{10}$, m is 2, x is 10, d is 5 and c is 1 and also $R^{10}$ is $C_{10}$, m is 2, x is 10, d is 5 and c is 2. In further particularly preferred embodiments, $R^{10}$ is $C_9$, m is 2, x is 7, d is 4 and c is 1, and also $R^{10}$ is $C_9$, m is 2, x is 7, d is 4 and c is 2 and further $R^{10}$ is $C_9$, m is 2, x is 10, d is 5 and c is 1 and also $R^{10}$ is $C_9$, m is 2, x is 10, d is 5 and c is 2.

In one preferred embodiment the defoaming agent (a) consists of at least one defoaming agent of the formula (I).

The air-introducing compound may preferably be at least one from the group consisting of polycarboxylate ethers, lignosulphonate, melamine-formaldehyde sulphonate, naphthalene-formaldehyde sulphonate, mono-, di-, tri- and polyglycols, polyalcohols, more particularly glycerol, alkanolamine, amino acids, sugars, molasses, organic and inorganic salts.

The air-introducing additive (b) in the sense of the present invention preferably comprises polycarboxylate ethers.

More particularly the polycarboxylate ether is a copolymer which is obtainable by polymerizing a mixture of monomers comprising
(II) at least one ethylenically unsaturated monomer which comprises at least one radical from the group consisting of carboxylic acid, carboxylic salt, carboxylic ester, carboxamide, carboxylic anhydride and carboximide and
(III) at least one ethylenically unsaturated monomer having a polyalkylene oxide radical.

The copolymers corresponding to the present invention comprise at least two monomer units. It may also, however, be advantageous to use copolymers having three or more monomer units.

In one preferred embodiment the ethylenically unsaturated monomer (II) is represented by at least one of the following general formulae from the group (IIa), (IIb) and (IIc):

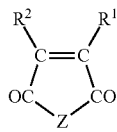
(IIb)

In the monocarboxylic or dicarboxylic acid derivative (IIa) and the monomer (IIb) present in cyclic form, where Z=O (acid anhydride) or $NR^2$ (acid imide), $R^1$ and $R^2$ independently of one another are hydrogen or an aliphatic hydrocarbon radical having 1 to 20 C atoms, preferably a methyl group. Y is H, —$COOM_a$, —CO—O($C_qH_{2q}O)_r$—$R^3$, —CO—NH—$(C_qH_{2q}O)_r$—$R^3$.

M is hydrogen, a monovalent or divalent metal cation, preferably sodium, potassium, calcium or magnesium ion, and also ammonium or an organic amine radical, and also a=½ or 1, depending on whether M is a monovalent or a divalent cation. Organic amine radicals used are preferably substituted ammonium groups, which derive from primary, secondary or tertiary $C_{1-20}$ alkylamines, $C_{1-20}$ alkanolamines, $C_{5-8}$ cycloalkylamines and $C_{6-14}$ arylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine, diphenylamine in the protonated (ammonium) form.

$R^3$ is hydrogen, an aliphatic hydrocarbon radical having 1 to 20 C atoms, a cycloaliphatic hydrocarbon radical having 5 to 8 C atoms, an aryl radical having 6 to 14 C atoms, it being possible for this radical optionally to be substituted, q=2, 3 or 4 and also r=0 to 200, preferably 1 to 150. The aliphatic hydrocarbons in this case may be linear or branched and also saturated or unsaturated. Cycloalkyl radicals considered to be preferred are cyclopentyl or cyclohexyl radicals, and aryl radicals considered to be preferred are phenyl radicals or naphthyl radicals, it also being possible more particularly for these radicals to be substituted by hydroxyl, carboxyl or sulphonic acid groups.

The formula below represents the monomer (IIc):

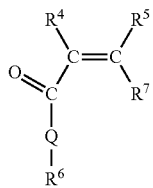
(IIc)

In this formula, $R^4$ and $R^5$ independently of one another are hydrogen or an aliphatic hydrocarbon radical having 1 to 20 C atoms, a cycloaliphatic hydrocarbon radical having 5 to 8 C atoms, an optionally substituted aryl radical having 6 to 14 C atoms. Q may be identical or different and is represented by NH, $NR^3$ or O, where $R^3$ possesses the definition stated above.

Furthermore, $R^6$ is identical or different and is represented by $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and $(C_nH_{2n})$—$NR^8_b$ where n=0, 1, 2, 3 or 4 and b=2 or 3.

$R^7$ is H, —$COOM_a$, —CO—O($C_qH_{2q}O)_r$—$R^3$, —CO—NH—$(C_qH_{2q}O)_r$—$R^3$, where $M_a$, $R^3$, q and r possess the definitions stated above.

$R^8$ is hydrogen, an aliphatic hydrocarbon radical having 1 to 10 C atoms, a cycloaliphatic hydrocarbon radical having 5 to 8 C atoms, an optionally substituted aryl radical having 6 to 14 C atoms.

With further preference in the sense of the present invention, the ethylenically unsaturated monomer (III) is represented by the following general formulae:

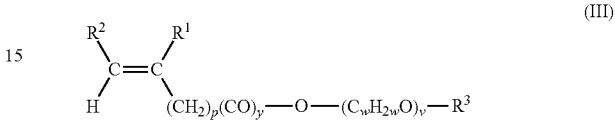
(III)

where p is an integer between 0 and 6, y is 0 or 1, v is an integer between 3 and 500 and w independently of one another for each $(C_wH_{2w}O)$ unit is identical or different and is an integer between 2 and 18.

$R^1$, $R^2$ and $R^3$ possess the definition stated above.

In one preferred embodiment, in the general formula (III), p is an integer between 0 and 4, v is an integer between 5 and 500 and w independently of one another for each $(C_wH_{2w}O)$ unit is identical or different and is 2 or 3.

The molar fraction of the monomers (II) and (III) in the polycarboxylate ether of the invention may be selected freely within wide ranges. It has proved to be particularly advantageous if the fraction of the monomer (II) in the copolymer is 5 to 95 mol %, preferably 30 to 95 mol % and more particularly 55 to 95 mol %. In an additionally preferred embodiment, the fraction of the monomer (III) in the copolymer is 1 to 89 mol %, more particularly 1 to 55 mol % and more preferably 1 to 30 mol %.

It is considered preferred in this context for the monomer (III) to have a molecular weight of 500 to 10 000 g/mol.

In one preferred embodiment, the copolymer of the invention possesses a molecular weight of 12 000 to 75 000 g/mol.

The air-introducing additive (b) in the sense of the present invention may additionally comprise alkanolamine, more particularly at least one mono-, di- or tertiary alkanolamine from the group consisting of triethanolamine, triisopropanolamine, diethanolisopropanolamine, ethanoldiisopropanolamine, poly(hydroxyalkylated)polyethyleneamine, N, N-bis(2-hydroxypropyl)-N-(hydroxyethyl)amine, 1-(N,N-bis(2-hydroxyethyl)amino)propan-2-ol, N,N,N',N'-tetra(2-hydroxyethyl)ethylenediamine, methyldiethanolamine, monoethanolamine, diethanolamine, monoisopropanolamine and diisopropanolamine. With particular preference the alkanolamine is triisopropanolamine.

In one preferred embodiment, the composition comprising cement clinker at the grinding stage optionally further comprises further components from the group consisting of fly ash, blast furnace slag, metakaolin, silica dust, finely ground limestone, pozzolans and ash, more particularly ash from rice husks and grain hulls. The method of the invention can also be used for the production of mixed cements. For this purpose, individual cements, each produced separately by grinding, can be mixed, with at least one of the individual cements being ground by the method of the invention, or a mixture of two or more cement clinkers is ground with the additives of the invention, to give a mixed cement. It is likewise possible for individual cements to be produced by simultaneous or separate grinding of clinker and composite materials. It is considered preferred, however, for the composition comprising cement clinker to consist to an extent of more than 60% by weight of Portland cement clinker.

The grinding operation takes place customarily in a ball mill. It is also possible in principle, however, for other mills, of the kind known within the cement industry, to be used. In one preferred embodiment the grinding is carried out in at least one mill from the group consisting of ball mill, stock-bed roller mill and horizontal mill.

Furthermore, in the method of the invention it is also possible to use at least one further known grinding assistant. In one preferred embodiment, water is added to the composition comprising cement clinker, before or during the grinding procedure.

In an additionally preferred embodiment, the composition comprising cement clinker is heated by a heat source during the grinding procedure.

It is additionally considered preferred for the composition to comprise an emulsifier. More particularly the emulsifier in question may comprise at least one oxo-process or fatty alcohol ethoxylate, of the formula $R^{11}$—$(C_2H_4$—$O$—$)_x$—$H$, where $R^{11}$ is a branched or unbranched $C_8$ to $C_{20}$ alkyl radical and x is an integer between 2 and 20.

Preferably, $R^{11}$ is $C_9$ to $C_{13}$ and x is an integer between 2 and 14; more preferably, $R^{11}$ is $C_{13}$ and x is an integer between 4 and 12. In one particularly preferred embodiment, $R^{11}$ is $C_{13}$ and x is 6 or x is 10. With further preference, $R^{11}$ is $C_{10}$ to $C_{18}$ and x is 7.

The emulsifiers may increase the stability of the defoamer in the hydraulic binder. More particularly the composition of the invention comprises between 0.0000001% to 0.5% by weight, more particularly between 0.0000005% to 0.5% by weight, of at least one emulsifier.

A further aspect of the present invention is a hydraulic binder which is produced by the method of the invention. Additionally embraced by the present invention is a cured building material product which has been produced from a hydraulic binder of the invention.

The present invention further provides an additive comprising
(a) 0.1 to 1 part by weight of at least one defoaming agent of the formula $$R^{10}\text{—}(C_mH_{2m}\text{—}O\text{—})_x\text{—}(C_dH_{2d}\text{—}O\text{—})_c\text{—}H \quad (I)$$

where
$R^{10}$ is a branched or unbranched $C_4$ to $C_{20}$ alkyl radical,
m for each $(C_mH_{2m}$—$O$—$)$ unit independently of one another is identical or different and is 2 or 3,
d for each $(C_dH_{2d}$—$O$—$)$ unit independently of one another is identical or different and is an integer between 4 and 20,
x is an integer between 2 and 20 and
c is an integer between 1 and 5,
(b) 1 to 20 parts by weight of at least one compound from the group consisting of polycarboxylate ethers, lignosulphonate, melamine-formaldehyde sulphonate, naphthalene-formaldehyde sulphonate, mono-, di-, tri- and polyglycols, polyalcohols, in particular glycerol, amino alcohols, amino acids, sugars, molasses, organic and inorganic salts and
(c) 0 to 40 parts by weight of water.

The additive of the invention is applied preferably in the form of an aqueous suspension to the composition comprising a hydraulic binder. In one preferred embodiment, the additive comprises between 10 and 30 parts by weight of water.

In one particularly preferred embodiment, the additive consists of (a), (b) and optionally (c).

The present invention further provides the use of an additive of the invention, comprising (a), (b) and optionally (c), in a composition comprising cement clinker, the additive being added before, during or after the grinding procedure for producing a hydraulic binder, for improving the compressive strength of the cured building material product produced therefrom.

The present invention makes available, in particular, a method for producing hydraulic binders, wherein the additives used, in addition to an outstanding effect during the grinding procedure, also have a positive effect on the subsequent curing and on the mechanical properties of the ground product. On make-up with water, the level of air introduction is low for the composition obtained in accordance with the method of the invention. More particularly, by this means, very good strength properties have been achieved for the composition of the invention at all stages of ageing after make-up with water, it having been possible to achieve a very good early strength after one day and also a high compressive strength after 28 days.

The examples which follow illustrate the advantages of the present invention.

EXAMPLES

The grinding tests were carried out in a planetary ball mill (Retsch GmbH). For each planet, 150.0 g of Portland cement clinker, 7.5 g of gypsum ($CaSO_4 \cdot 2H_2O$), 0.088 g of triisopropanolamine (TiPA) 85% (technical grade, 85% strength solution in water) and the amount of defoamer indicated below in each case were weighed out.

Grinding then took place for 2 minutes at 200 $\text{min}^{-1}$ (rotary speed of the main disc) and for 2 minutes at 400 $\text{min}^{-1}$. Grinding was started at room temperature without additional supply of heat, but as a result of the friction during grinding, the temperature rose to about 60-70° C. at the end of grinding. The resulting cement was passed through a 1 mm sieve for the purpose of removing the grinding balls.

10 grinds were carried out for each test, the respective cements obtained being combined and the sample being homogenized.

The resulting cements were then tested in a mortar to DIN EN 196-1. For this purpose, the cements were mixed with standard sand (sand to cement ratio 3:1) with a constant water/cement ratio (w/c)=0.5, and the following values were ascertained: air pore content to DIN 18555-2 after mixing (initial), mortar slump after mixing and after 30 minutes, gross mortar density after mixing and after 30 minutes, and compressive strength on standard test specimens after 1, 7 and 28 days (production, storage and testing of the compressive strength in accordance with DIN EN 196-1).

Results Part 1: Comparative Tests with Identical Metering Quantities

The tests were carried out using the following defoamer structures of the formula (I):

| | Chemical structure | | |
|---|---|---|---|
| Identification | Starter alcohol ($R^{10}$) | $(C_mH_{2m}$—$O$—$)_x$ | $(C_dH_{2d}$—$O$—$)_c$ |
| Blank | — | — | — |
| Blank + TiPA | — | — | — |
| Comparative example 1 | $C_{13}$-$C_{15}$ alcohol | m = 2; x = 12 | c = 5; d = 3 |
| Comparative example 2 | $C_{13}$-$C_{15}$ alcohol | m = 2; x = 16 | c = 4; d = 3 |
| Defoamer 1 | 2-Propylheptanol | m = 2; x = 10 | c = 1:1 mixture of 1 and 2; d = 5 |
| Defoamer 2 | Isodecanol | m = 2; x = 7 | c = 1:1 mixture of 1 and 2; d = 4 |

As comparative examples 1 and 2, defoamer structures of the kind described in patent application WO 2011/022217 were used. For each grind, 0.075 g of defoamer was metered in (0.05% by weight, based on the initial mass of cement). For the "blank" experiments, only the clinker was ground, without use of TiPA and defoamer; for the "blank+TiPA" series, the cement was ground with TiPA but without addition of defoamer.

When the standard mortar test in accordance with DIN EN 196-1 was conducted, the results obtained were as follows:

Properties of the Fresh Mortar:

|  | Slump (cm) | | Air pore content (%) | Gross mortar density ($kg \cdot dm^{-3}$) | |
| --- | --- | --- | --- | --- | --- |
|  | Initial | 30 min |  | Initial | 30 min |
| Blank | 18.4 | 17.2 | 3.8% | 2.215 | 2.213 |
| Blank + TiPA | 19.5 | 17.5 | 7.1% | 2.142 | 2.165 |
| Comparative example 1 | 22.3 | 20.4 | 21.5% | 1.792 | 1.819 |
| Comparative example 2 | 22.4 | 20.7 | 19.5% | 1.799 | 1.852 |
| Inventive example 1 | 19.1 | 17.2 | 4.9% | 2.202 | 2.204 |
| Inventive example 2 | 19.3 | 17.7 | 5.1% | 2.194 | 2.199 |

Evolution of Strength:

|  | Compressive strength (MPa) | | | Compressive strength (% relative to blank) | | |
| --- | --- | --- | --- | --- | --- | --- |
| Defoamer | 1 day | 7 days | 28 days | 1 day | 7 days | 28 days |
| Blank | 9.1 | 40.0 | 58.8 | — | — | — |
| Blank + TiPA | 9.2 | 43.3 | 58.3 | +1.1 | +8.3 | −0.8 |
| Comparative example 1 | 4.0 | 16.7 | 19.4 | −56.0 | −58.3 | −67.0 |
| Comparative example 2 | 4.2 | 16.7 | 21.6 | −53.8 | −58.3 | −63.3 |
| Inventive example 1 | 9.7 | 45.3 | 61.9 | +6.5 | +13.3 | +5.3 |
| Inventive example 2 | 10.5 | 47.3 | 61.5 | +15.4 | +18.3 | +4.6 |

On grinding with addition of TiPA, there is a marked increase, as expected, in the air pore content when the cement is subsequently tested in standard mortar, relative to the test with cement without TiPA, and this is also reflected in a slight reduction in the 28-day strengths. The compressive strengths after 1 and 7 days are increased slightly and markedly, respectively.

Using the defoamers described in WO 2011/022217 (Comparative examples 1 and 2), the introduction of air pores in the standard mortar is very great, and the gross mortar densities are far lower. The markedly reduced compressive strengths at all measurement times are a testimony to the fact that even at later times there is no deaeration and the air pores remain in the mortar.

Using the inventive defoamers 1 and 2 (Inventive examples 1 and 2), in contrast, it is possible to reduce the air pore content markedly relative to that when using TiPA. The standard mortar results for these cements show markedly improved compressive strengths at all measurement times.

Results Part 2: Variation in Metering Quantities

For this series of tests, defoamer 2 was used. The test procedure was similar to that described above, but different amounts of defoamer were added, in order to test the activity even at relatively low levels of metering.

When the standard mortar test was carried out (see description of test), the result obtained was as follows:

Properties of the Fresh Mortar:

|  | Defoamer (g) | Slump (cm) | | Air pore content (%) | Gross mortar density ($kg \cdot dm^{-3}$) | |
| --- | --- | --- | --- | --- | --- | --- |
| Defoamer |  | Initial | 30 min |  | Initial | 30 min |
| Blank | — | 18.4 | 17.2 | 3.8% | 2.215 | 2.213 |
| Blank + TiPA | — | 19.5 | 17.5 | 7.1% | 2.142 | 2.165 |
| Inventive example 4 | $7.5 \cdot 10^{-4}$ | 18.8 | 17.6 | 5.8% | 2.168 | 2.182 |
| Inventive example 5 | $7.5 \cdot 10^{-3}$ | 18.9 | 17.3 | 5.4% | 2.185 | 2.175 |
| Inventive example 6 | $7.5 \cdot 10^{-2}$ | 19.3 | 17.7 | 5.1% | 2.194 | 2.199 |

Evolution of Strength:

|  | Compressive strength (MPa) | | | Compressive strength (% relative to blank) | | |
| --- | --- | --- | --- | --- | --- | --- |
| Defoamer | 1 day | 7 days | 28 days | 1 day | 7 days | 28 days |
| Blank | 9.1 | 40.0 | 58.8 | — | — | — |
| Blank + TiPA | 9.2 | 43.3 | 58.3 | +1.1 | +8.3 | −0.8 |
| Inventive example 4 | 10.3 | 42.8 | 57.6 | +13.1 | +7.0 | −2.0 |
| Inventive example 5 | 10.0 | 44.0 | 57.4 | +9.9 | +10.0 | −2.4 |
| Inventive example 6 | 10.5 | 47.3 | 61.5 | +15.4 | +18.3 | +4.6 |

Even at low levels of metering of $7.510^{-4}$ g (0.0005% by weight, based on the cement weight), it is possible to achieve a reduction in the air pore content and also an increase in the 1-day and 7-day compressive strengths, while the 28-day compressive strengths remain virtually unchanged. This clearly shows the effectiveness of the defoamer of the invention.

Results Part 3: Evaluation as Defoamer in Mortar/Concrete Application

Additionally to the performance of the defoamers in the grinding process, the possibility of using them as defoaming agents for mortar and concrete was evaluated. The tests were performed in mortar, the following basic mix design was used:

| Mixture component | Amount |
| --- | --- |
| Cement Type CEM I 42.5R | 900 g |
| Standard Sand | 2700 g |
| Total water | 450 g (w/c 0.50) |

For this purpose, a commercially available cement CEM I Type 42,5R was used. The cement was mixed with standard sand with a constant water/cement ratio (w/c)=0.5 and the subsequently described additives, and the following values were ascertained: air pore content to DIN 18555-2 after mixing and mortar slump after mixing.

Three mixes were performed. In the first mix (blank) no additive was used, in the second mix a polycarboxylate ether comb polymer (PCE) without any defoamer addition was used. In the third trial the same type and amount of polycarboxylate ether comb polymer together with the invention related Defoamer 1 was used.

In the table below the results are shown:

| Mix # | Addtive | Undefoamed PCE (g solids) | Defoamer 1 (g solids) | Slump (cm) | Air content (%) |
|---|---|---|---|---|---|
| 1 | Blank | — | — | 20.6 | 6.3 |
| 2 | PCE | 0.9 | — | 24.0 | 12.8 |
| 3 | PCE + Defoamer 1 | 0.9 | $8.0 \cdot 10^{-3}$ | 23.4 | 4.4 |

As expected, the mortar mix #2 with addition of the Polycarboxylate ether comb polymer and without any defoamer added shows a higher air content than the mix #1 (blank). By using the invention related defoamer in mix #3, the air content could be significantly reduced, proving the effectiveness of the defoamer.

The invention claimed is:

1. Method for producing a hydraulic binder, comprising contacting a composition comprising cement clinker, before, during or after a grinding procedure, with
   (a) a defoaming agent and
   (b) 0.0005% to 2% by weight, based on the total composition, of at least one air-introducing compound,
   characterized in that the defoaming agent (a) comprises 0.0001% to 0.5% by weight, based on the total composition, of at least one defoaming agent of the formula $$R^{10}-(C_mH_{2m}-O-)_x-(C_dH_{2d}-O-)_c-H \quad (I)$$

where
   $R^{10}$ is a branched or unbranched $C_4$ to $C_{20}$ alkyl radical,
   m for each $(C_mH_{2m}-O-)$ unit independently of one another is identical or different and is 2 or 3,
   d for each $(C_dH_{2d}-O-)$ unit independently of one another is identical or different and is an integer between 4 and 20,
   x is an integer between 2 and 20 and
   c is an integer between 1 and 5,
   and the ratio of (a) to (b) is between 1:1 to 1:200.

2. The method according to claim 1, characterized in that the air-introducing compound is at least one from the group consisting of polycarboxylate ethers, lignosulphonate, melamine-formaldehyde sulphonate, naphthalene-formaldehyde sulphonate, mono-, di-, tri-and polyglycols, polyalcohols, alkanolamine, amino acids, sugars, molasses, organic and inorganic salts.

3. The method according to claim 2, characterized in that the polycarboxylate ether is a copolymer which is obtained by polymerizing a mixture of monomers comprising
   (II) at least one ethylenically unsaturated monomer which comprises at least one radical from the group consisting of carboxylic acid, carboxylic salt, carboxylic ester, carboxamide, carboxylic anhydride and carboximide and
   (III) at least one ethylenically unsaturated monomer having a polyalkylene oxide radical.

4. The method according to claim 3, characterized in that the ethylenically unsaturated monomer (II) is represented by at least one of the following general formulae from the group (IIa), (IIb) and (IIc)

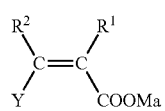
(IIa)

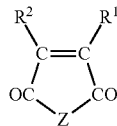
(IIb)

where
$R^1$ and $R^2$ independently of one another are hydrogen or an aliphatic hydrocarbon radical having 1 to 20 C atoms,
Y is H, $-COOM_a$, $-CO-O(C_qH_{2q}O)_r-R^3$, or $-CO-NH-(C_qH_{2q}O)_r-R^3$,
M is hydrogen, a monovalent or divalent metal cation, ammonium ion or an organic amine radical,
a is ½ or 1,
$R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms,
q independently of one another for each $(C_qH_{2q}O)$ unit is identical or different and is 2, 3 or 4,
r is 0 to 200, and
Z is O, or $NR^3$,

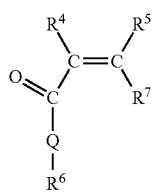
(IIc)

where
$R^4$ and $R^5$ independently of one another are hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms,
Q is identical or different and also represented by NH, $NR^3$ or O;
where $R^3$ possesses the definition stated above,
$R^6$ is identical or different and also represented by $(C_nH_{2n})-SO_3H$ where n=0, 1, 2, 3 or 4, $(C_nH_{2n})-OH$ where n=0, 1, 2, 3 or 4, $(C_nH_{2n})-PO_3H_2$ where n=0, 1, 2, 3 or 4, $(C_nH_{2n})-OPO_3H_2$ where n=0, 1, 2, 3 or 4, $(C_6H_4)-SO_3H$, $(C_6H_4)-PO_3H_2$, $(C_6H_4)-OPO_3H_2$ or $(C_nH_{2n})-NR^8_b$ where n=0, 1, 2, 3 or 4 and b=2 or 3,
$R^7$ is H, $-COOM_a$, $-CO-O(C_qH_{2q}O)_r-R^3$, or $-CO-NH-(C_qH_{2q}O)_r-R^3$,
where $M_a$, $R^3$, q and r possess definitions stated above, and
$R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

5. The method according to claim 3, characterized in that the ethylenically unsaturated monomer (III) is represented by the following general formula

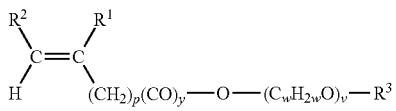

in which
p is an integer between 0 and 6,
y is 0 or 1,
v is an integer between 3 and 500,
w independently of one another for each $(C_wH_{2w}O)$ unit is identical or different and is an integer between 2 and 18, and
where $R^1$ and $R^2$ independently of one another are hydrogen or an aliphatic hydrocarbon radical having 1 to 20 C atoms,
and $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms.

6. The method according to claim 2, characterized in that the alkanolamine is at least one mono-, di-or tertiary alkanolamine from the group consisting of triethanolamine, triisopropanolamine, diethanolisopropanolamine, ethanoldiisopropanolamine, poly(hydroxyalkylated)polyethyleneamine, N,N-bis(2-hydroxypropyl)-N-(hydroxyethyl)amine, 1-(N,N-bis(2-hydroxyethyl)amino)propan-2-ol, N,N,N',N'-tetra(2-hydroxyethyl)ethylenediamine, methyldiethanolamine, monoethanolamine, diethanolamine, monoisopropanolamine and diisopropanolamine.

7. The method according to claim 1, characterized in that the composition comprising cement clinker comprises at least one further component selected from the group consisting of fly ash, blast furnace slag, metakaolin, silica dust, finely ground limestone, pozzolans and ash.

8. The method according to claim 1, characterized in that the composition comprising cement clinker consists to an extent of more than 60% by weight of Portland cement clinker.

9. The method according to claim 1, characterized in that the grinding procedure is carried out in at least one mill selected from the group consisting of ball mill, stock-bed roller mill and horizontal mill.

10. The method according to claim 1, characterized in that water is added to the composition comprising cement clinker, before or during the grinding procedure.

11. The method according to claim 1, characterized in that the composition comprises at least one emulsifier.

12. Hydraulic binder produced according to the method of claim 1.

13. Cured building material product produced from a hydraulic binder according to claim 12.

14. Additive comprising
(a) 0.1 to 1 part by weight of at least one defoaming agent of the formula

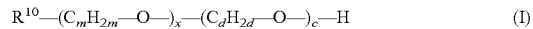

where
$R^{10}$ is a branched or unbranched $C_4$ to $C_{20}$ alkyl radical,
m for each $(C_mH_{2m}-O-)$ unit independently of one another is identical or different and is 2 or 3,
d for each $(C_dH_{2d}-O-)$ unit independently of one another is identical or different and is an integer between 4 and 20,
x is an integer between 2 and 20 and
c is an integer between 1 and 5,
(b) 1 to 20 parts by weight of at least one compound from the group consisting of polycarboxylate ethers, lignosulphonate, melamine-formaldehyde sulphonate, naphthalene-formaldehyde sulphonate, mono-, di-, tri-and polyglycols, polyalcohols, amino alcohols, amino acids, sugars, molasses, organic and inorganic salts and
(c) 0 to 40 parts by weight of water.

15. A method for utilizing an additive according to claim 14 in a composition comprising cement clinker, the additive being added before, during or after a grinding procedure for producing a hydraulic binder, for improving the compressive strength of the cured building material product produced therefrom.

16. The method according to claim 4, characterized in that the ethylenically unsaturated monomer (III) is represented by the following general formula

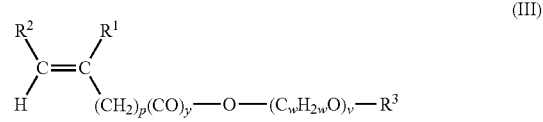

in which
p is an integer between 0 and 6,
y is 0 or 1,
v is an integer between 3 and 500, and
w independently of one another for each $(C_wH_{2w}O)$ unit is identical or different and is an integer between 2 and 18, and
where $R^1$ and $R^2$ independently of one another are hydrogen or an aliphatic hydrocarbon radical having 1 to 20 C atoms,
and $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms.

* * * * *